United States Patent [19]

Laskowski et al.

[11] Patent Number: 4,930,386
[45] Date of Patent: Jun. 5, 1990

[54] SAWMILL WITH HYDRAULICALLY ACTUATED COMPONENTS

[75] Inventors: Donald R. Laskowski, Indianapolis; Daniel R. Tekulve, Batesville, both of Ind.

[73] Assignee: Wood-Mizer Products, Inc., Indianapolis, Ind.

[21] Appl. No.: 131,121

[22] Filed: Dec. 10, 1987

[51] Int. Cl.$^5$ .......................... B23D 55/04; B26D 5/20
[52] U.S. Cl. ........................... 83/399; 83/733; 83/795; 83/928; 414/546
[58] Field of Search ................. 83/794, 795, 801, 928, 83/574, 72, 62, 62.1, 399, 733; 414/546, 911, 680; 212/189; 280/764.1

[56] References Cited

U.S. PATENT DOCUMENTS

| | | |
|---|---|---|
| 2,586,483 | 2/1952 | Ross . |
| 2,620,836 | 12/1952 | Pugh . |
| 3,043,352 | 7/1962 | Reimer . |
| 3,683,982 | 8/1972 | Pryor . |
| 4,253,361 | 3/1981 | Pryor et al. . |
| 4,431,362 | 2/1984 | Wech, Jr. et al. .............. 414/680 X |
| 4,435,119 | 3/1984 | House .............................. 414/911 X |
| 4,519,283 | 5/1985 | Sanborn . |
| 4,544,008 | 10/1985 | Reini ............................... 414/546 X |
| 4,559,858 | 12/1985 | Laskowski et al. . |

Primary Examiner—Frank T. Yost
Assistant Examiner—Eugenia A. Jones
Attorney, Agent, or Firm—Barnes & Thornburg

[57] ABSTRACT

A sawmill has an elongated track extending longitudinally adjacent a platform for supporting a log. A carriage which carries a bandsaw is reciprocally movable along the track past the platform to cut the log with the bandsaw. The sawmill also has a clamp mechanism reciprocally movable laterally across the platform to clamp the log in place, which mechanism is movable between an upright position and a reclining position to provide a clamp for an uncut log and a clamp for a squared log. The sawmill also has a log turning mechanism and a log loading mechanism. The log loading mechanism includes two arms which are rotatable from the ground to the platform to load a log onto the platform. A hydraulic cylinder is coupled to each arm and acts against the ground to move the arms. The mechanisms are hydraulically actuated and the sawmill includes an electric motor which drives a hydraulic pump for providing pressurized hydraulic fluid to actuate the hydraulically actuated mechanisms. A source of electricity for powering the electric motor is carried on the carriage and is interlocked to the electric motor such that electricity is provided to the electric motor only when the carriage is in a predetermined position which is preferably at one end of the track.

35 Claims, 7 Drawing Sheets

SAWMILL WITH HYDRAULICALLY ACTUATED COMPONENTS

BACKGROUND AND SUMMARY OF THE INVENTION

The present invention relates to sawmills, and more particularly to the provision of a sawmill which has power-actuated mechanisms for loading a log onto the mill, clamping the log to the mill, rotating the log about its axis, and levelling the log on the mill.

Sawmills of the type for which the improvements of the present invention are provided are well known in the art. One such sawmill is disclosed in U.S. Pat. No. 4,559,858 issued Dec. 24, 1985. Such sawmills can comprise elongated track means, platform means for supporting a log or other wood to be cut adjacent the track means, a carriage movable longitudinally along the track means past the platform, and cutting means, such as a band saw, mounted on the carriage to cut the log as it passes over the platform.

It will be clear from prior U.S. Pat. No. 4,559,858 that such sawmills illustratively may be relatively light weight as compared to larger rotating blade sawmill machines used in permanently-located commercial sawmills. The illustrative sawmill improved by the present invention is a portable sawmill, illustratively trailer-mounted or wheel-mounted, which may be pulled behind a truck or tractor directly to the timber to be cut. Round logs may be sliced into planks in the forest so that only the planks have to be hauled out in a truck to save trucking expense.

Heretofore, many such portable or relatively small sawmills have typically been constructed such that the logs have been manually loaded onto the sawing platform, manually clamped in place on the platform and, if necessary, manually rotated about the log axis to square up the log in cross section, i.e., produce a cant.

The sawmill of the present invention is, comparatively speaking, a production sawmill with improved power-loading mechanisms, power-clamping mechanisms and power-rotating mechanisms. The primary driver or power unit for such a sawmill is the illustrative gasoline engine on the band saw carriage which drives the band saw. This gasoline engine may also be used to drive an electrical generator to provide the necessary electric power required by the system of the present invention. Just how this is accomplished within the present invention will be described hereinafter.

The present invention, therefore, is a sawmill comprising elongated track means, platform means for supporting a log adjacent the track means, a carriage movable longitudinally along the track means past the platform means, cutting means mounted on the carriage to cut the log on the platform means and means for loading the log onto the platform means. Illustratively, the sawmill may also include means for clamping the log to be cut on the platform means, means for rotating the log about its axis on the platform means so that the log can be squared in cross section, and means for levelling the log on the platform.

In the illustrative embodiment, the loading means, clamping means, rotating means and levelling means are all hydraulically actuated by a hydraulic power pack including an electrically-driven motor and a hydraulic pump, reservoir, valves and tubing as required. Each of the loading means, clamping means, log-rotating means, and levelling means is driven by a hydraulic motor or hydraulic cylinder and piston arrangement controlled by the power pack. The power pack, of course, includes the necessary valve means for coupling pressurized hydraulic fluid from the pump to the hydraulic motors to drive the hydraulic motors, i.e., extend and retract the hydraulic cylinders.

In the present invention, the loading means includes log-engaging means movable toward and away from the platform, ground-engaging means for engaging the ground and means for driving the log-engaging means toward and away from the platform. The driving means acts between the log-engaging means and the ground-engaging means. As indicated above, the driving means may illustratively be a hydraulic motor or hydraulic cylinder and piston assembly controlled by the power pack. In the present invention, the loading means comprises arms pivotally mounted to the platform to serve as the log-engaging means and ground engaging legs also pivotally mounted to the platform to serve as ground-engaging means. The drive means or hydraulic cylinder means acts between the log-engaging arms and the ground engaging legs so that the weight of the log is actually supported on the ground when a log is being lifted to the platform. This feature permits loading of heavy logs without requiring the platform or entire sawmill to be stabilized by heavy outriggers. Further, the arms and legs are pivotally movable to a nonuse storage position above the platform for storage and transit.

Further, the sawmill of the present invention comprises means for actuating each of the log-handling means, i.e., loading means, clamping means, rotating means, and levelling means, and means for interlocking the aforesaid driving means, e.g., the hydraulic cylinders, to the actuating means to allow the actuating means to actuate the driving means only when the sawmill carriage is in a predetermined position along the track means. In the illustrative embodiment, for instance, the predetermined position along the track means is the proximal end or near proximal end of the track means. At that predetermined position, the electrical power system on the band saw carriage provides power to the aforedescribed power pack so that the various log-handling means can be manipulated while the carriage is at that predetermined position. It will be appreciated, therefore, that the various log-handling means will not be movable when the carriage is away from the predetermined position.

Additional objects, features, and advantages of the invention will become apparent to those skilled in the art upon consideration of the following detailed description of the preferred embodiment exemplifying the best mode of carrying out the invention as presently perceived.

DETAILED DESCRIPTION OF THE DRAWINGS

Figure 1:
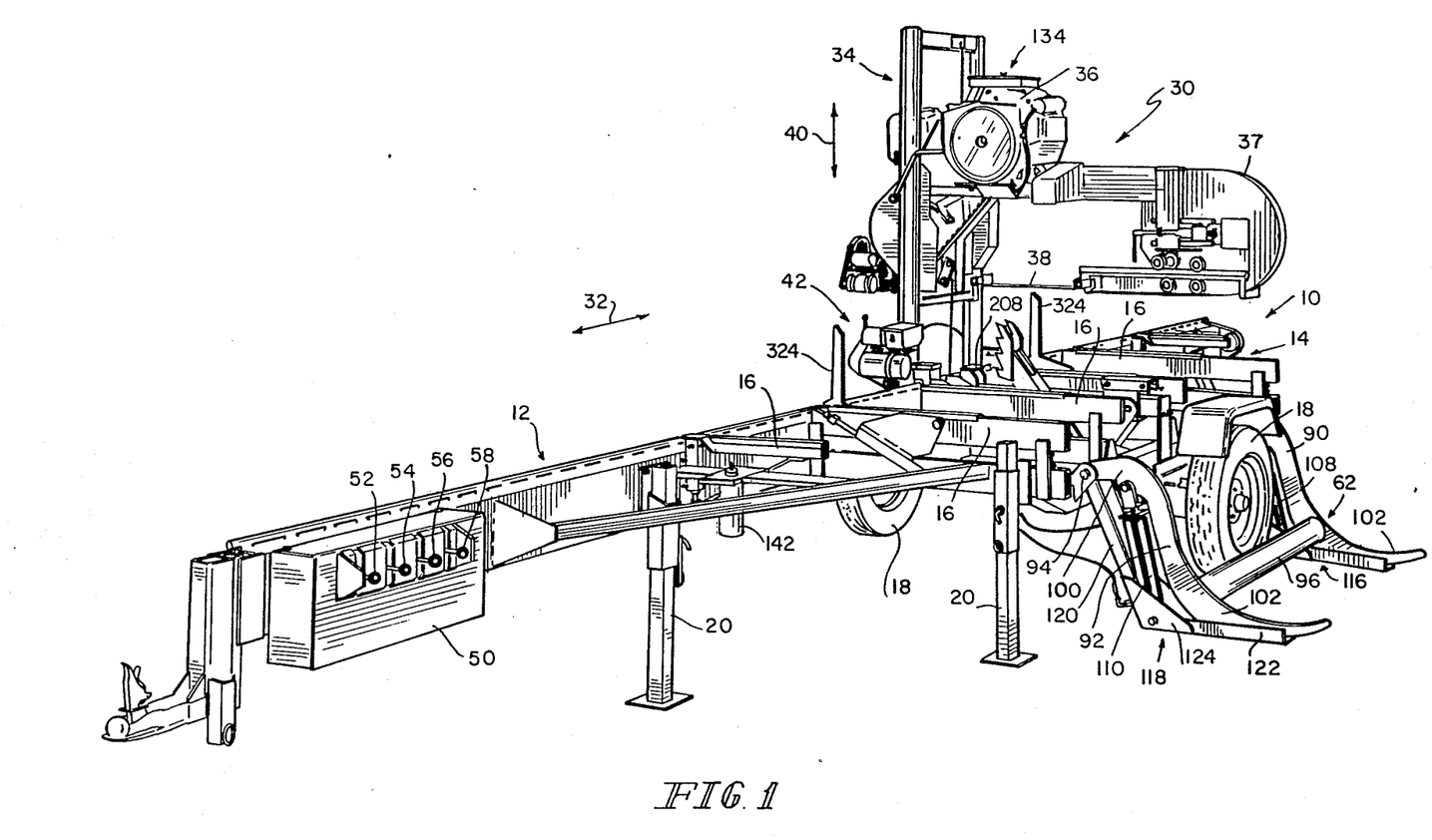
FIG. 1 is a perspective view of the illustrative sawmill of the present invention.

Turning now to the drawings, and particularly to FIG. 1, in which the illustrative sawmill 10 of the present invention is shown in perspective, sawmill 10 includes track means or track 12 extending longitudinally adjacent platform means or platform 14, provided by laterally-extending support members 16, wheels 18 and support legs 20, which may be lowered when the sawmill is in its use position, as shown. The general construction of the sawmill 10 of the present invention is described in the aforesaid U.S. Pat. No. 4,559,858 which is incorporated herein for purposes of describing how such a sawmill is constructed and how it operates. Details of the sawmill construction not particularly related to the improvements of the present invention may be studied in the aforesaid U.S. Pat. No. 4,559,858.

The illustrative sawmill 10 includes a carriage 30 which moves from end to end along the track 12 as depicted by the arrow 32. The carriage 30 includes, for instance, support posts 34 upon which an engine 36 and a band saw 37, including the cutting band or blade 38, are mounted for movement vertically as indicated by the arrow 40. There is a feed mechanism 42 for driving the carriage 30 along the track 12 and, of course, a mechanism (unshown) for raising and lowering the band saw 37 on the support 34 is provided.

Essentially, in the operation of the sawmill 10, a log is placed lengthwise on the platform 14, i.e., on support members 16, alongside the track 12 and generally under the band saw 37 and particularly the cutting portion of the band 38. The carriage 30 is reciprocated back and forth along the track 12 and the band saw 37 is lowered to take slices from the log as the carriage 30 is reciprocated.

Figure 2:
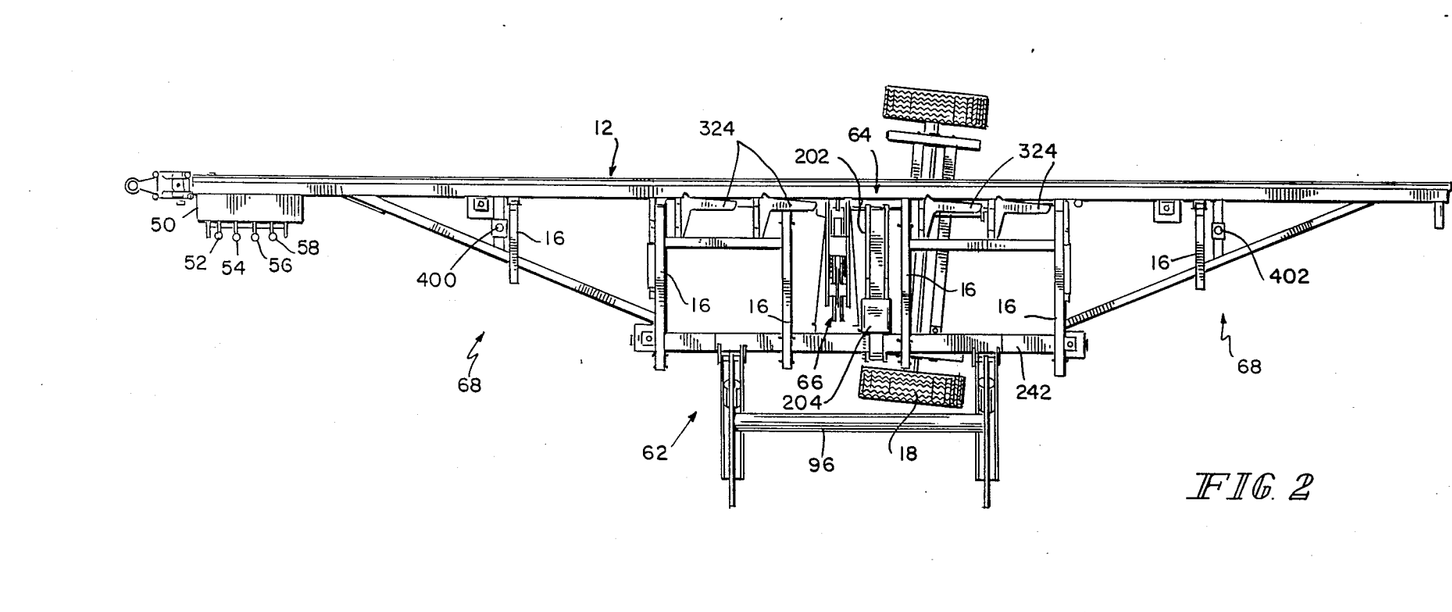
FIG. 2 is a top plan view of the sawmill of the present invention with the carriage removed.

The sawmill 10 of the present invention, however, includes a hydraulic power pack 50 with illustrative hydraulic valve control levers 52, 54, 56 and 58. These levers may be operated to operate log-loading means 62 (FIGS. 1, 2, 3 and 4), log-clamping means 64 (FIGS. 7, 8 and 9), log-rotating means 66 (FIGS. 10 and 11), and log-levelling means 68 (FIGS. 1 and 2). In the illustrative and preferred embodiment, these mechanisms 62, 64, 66, 68 are hydraulic power-actuated mechanisms controlled from the power pack controller 50 by manipulation of the levers 52, 54, 56, 58.

The power pack 50 may illustratively comprise an electric motor 70 (FIG. 12), a hydraulic pump 72 driven by the motor 70, a reservoir 74 of hydraulic fluid, pump valves 63, 65, 67, 69, and conventionally required components normally associated with hydraulic power packs driven by electric motors such as tubing, etc. As described hereinafter in connection with FIG. 12, the pump valves 63, 65, 67, 69, actuate hydraulic cylinders 108, 110, 136, 138, 140, 142, 143 to provide the desired movement of the log-loading means 62, log-clamping means 64, log-rotating means 66, and log-levelling means 68. Pump valves 63, 65, 67, 69 are actuated by manipulating levers 52, 54, 56, 58, respectively.

Figure 5:
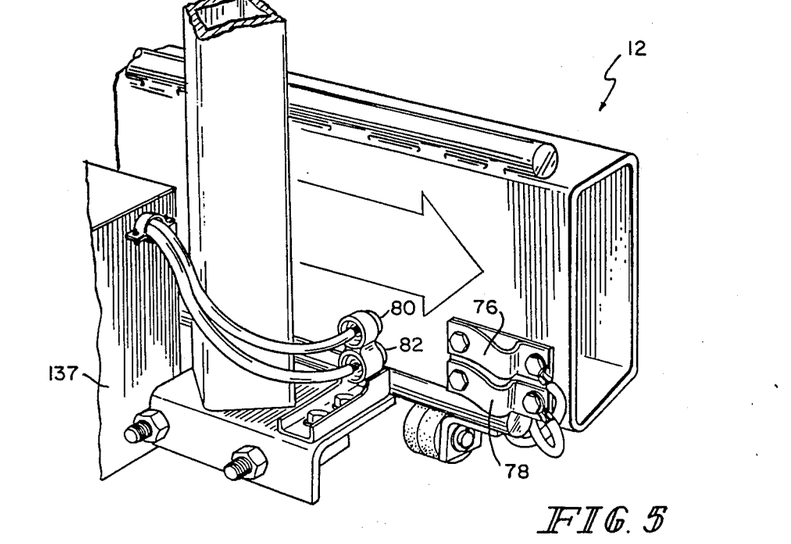
FIGS. 5 and 6 are fragmentary perspective views showing the electrical interlock system for the hydraulic drivers for the loading means, clamping means, rotating means, and levelling means.
Figure 6:
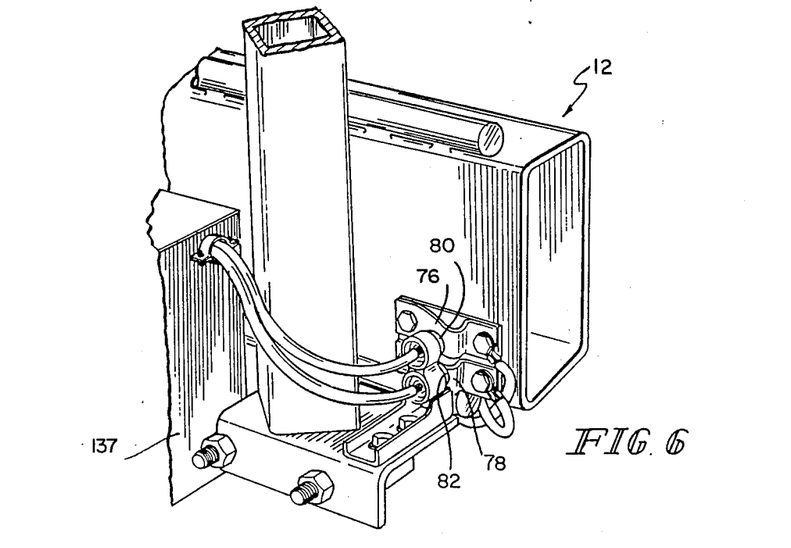

It will be seen that the hydraulic power pack 50 is located at the proximal end or front end of the track 12. The electric motor 70 of the power pack 50 can be energized only when the carriage 30 is at its predetermined position adjacent the proximal end (adjacent the power pack 50) of the track 12. This is accomplished as shown in FIGS. 5 and 6 by having a pair of electrical contacts 76, 78 fixed at the proximal end of the track 12 to be engaged by electric contacts 80, 82, respectively, mounted on the carriage 30. This contacting relationship is shown in FIG. 6. The electric contacts 76, 78, 80 and 82 serve as means for interlocking the pump valves 63, 65, 67, 69 inside the power pack 50 to the loading means 62, clamping means 64, rotating means 66 and levelling means 68.

When the electrical contacts 76, 78 and 80 and 82, respectively, are made as shown in FIG. 6, an electric power source 134 (FIG. 1) mounted on the carriage 30 provides electricity to power the electric motor 70 which drives the pump 72. Pump 72 provides hydraulic power, i.e., pressurized hydraulic fluid, for the hydraulic cylinders 108, 110, 136, 138, 140, 142, 143. Illustratively, engine 36 includes a built-in alternator and regulator which is coupled to and charges a battery 137 (FIGS. 5 and 6), all of which are carried by carriage 30. Engine 36, its built-in alternator and regulator, and battery 137 illustratively comprise electric power source 134.

When the carriage 30 moves to the right in FIG. 1, i.e., away from the proximal end of the track 12, contacts 80, 82 (FIG. 5) are carried away from contacts 76, 78 disconnecting electric power source 134 from the electric motor 70 (FIG. 12) of hydraulic power pack 50 (FIG. 1). Thus, no electric power is provided to the power pack 50 which precludes use of the hydraulic mechanisms.

Figure 3:
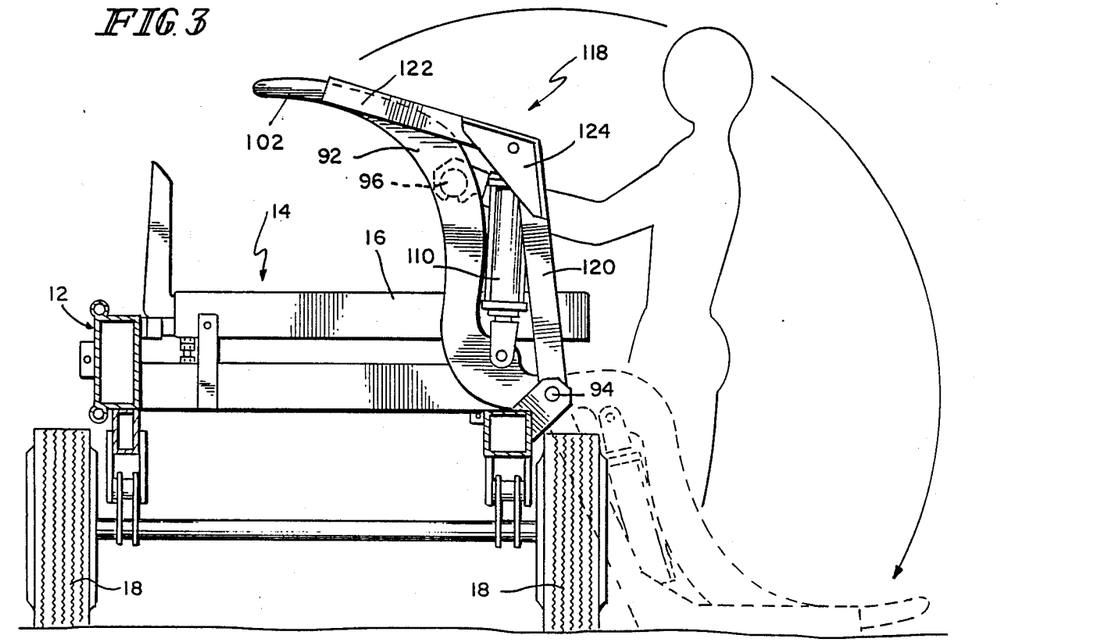
FIG. 3 is a transverse sectional view showing how the log-loading means and ground engaging means may be pivoted up over the log support platform for storage in a nonuse position during transit of the sawmill.
Figure 4:
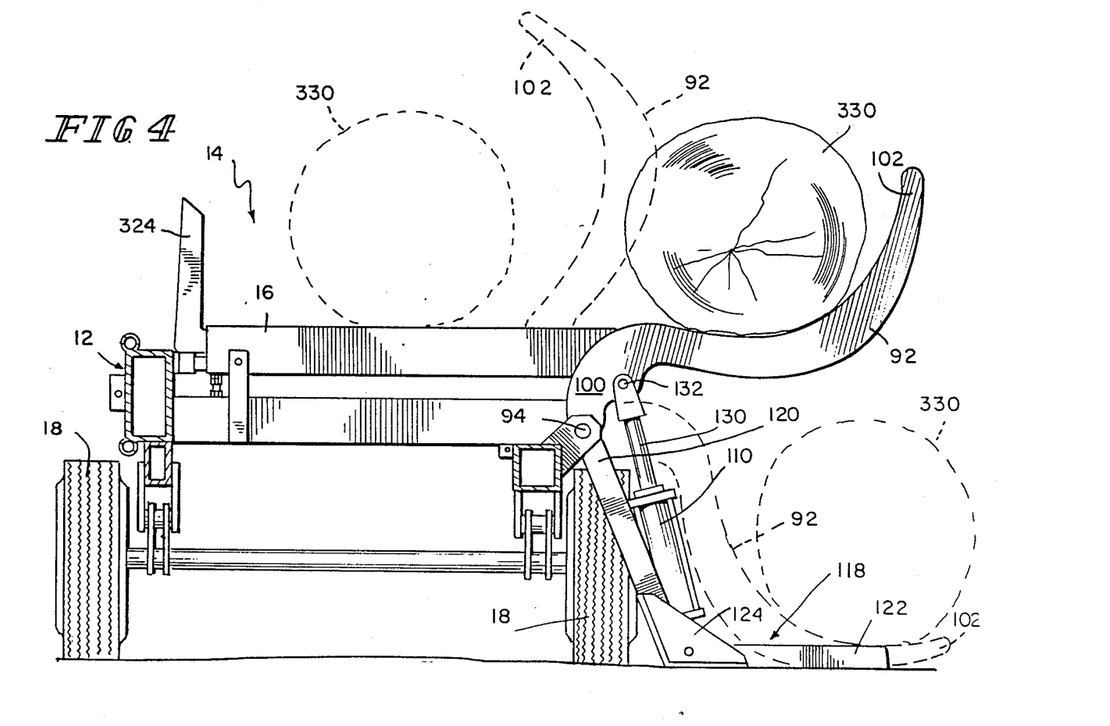
FIG. 4 is a similar sectional view showing how the log-loading means is actuated to lift a log from the ground upwardly onto the log support platform.

Turning first to the log-loading means 62 best shown in FIGS. 1, 2, 3 and 4, it will be seen that the illustrative loading means 62 comprises a pair of arms 90, 92 pivotally mounted to the platform 14 as indicated at 94. These two arms 90, 92 are preferably connected for movement together by a cross member 96. Each arm 90, 92 has an upper or proximal end 100 pivotally connected to the platform 14 and a distal or lower or outer end 102 for supporting the log. As best seen in FIGS. 3 and 4, the arms 90, 92 are sort of reversed S-shaped arms such that, in the lower position shown in FIG. 1, a log may be rolled onto the distal ends 102. When the arms 90, 92 are raised, as depicted in FIG. 4, the log will roll laterally inwardly away from the distal ends 102 toward the platform 14 and onto the upper surfaces of the platform members 16. It has been found that the reverse S-shaped arms 90, 92 depicted in the drawings are very effective for moving a heavy log onto the platform 14.

Each arm 90, 92 is illustratively driven by a hydraulic cylinder 108, 110 such that, when the cylinders are retracted, the arms 90, 92 are in their lower positions as shown in FIG. 1 and in the lower phantom-line drawing of FIG. 4. When the cylinders 108, 110 are extended, of course, the arms 90, 92 are raised counter-clockwise about their pivots 94 as depicted in FIG. 4.

An important feature of the present invention is the ground-engaging means or ground-support means for the cylinders 108, 110 or for the arms, 90, 92. Underlying arms 90, 92 are ground-engaging legs 116, 118. Both of these legs 116, 118 are also pivotally mounted to the platform 14 as indicated at 94 such that the entire log-loading means 62 may be pivoted upwardly to its non-use storage and transit position as shown in FIG. 3. It will further be seen that, illustratively, each ground-engaging leg or support leg 116, 118 is formed to have a proximal or upper end 120 and a lower or distal end 122 which may be rigidly fastened together at a knee as indicated at 124 by gusset plates or other such means. The cylinders 108, 110 are illustratively connected between the gusset plates 124 and the proximal ends 100 of the arms 90, 92. This means that, when the cylinders 108, 110 are extended, the arms 90, 92 are separated from their respective ground-engaging legs 116, 118. This means that the lifting force for lifting the logs is actually acting against the ground through the legs 116, 118. This eliminates the need for outriggers and the like to stabilize platform 14.

Each cylinder 108, 110, of course, includes a piston rod 130 as is well known. As best seen in FIG. 4, the distal end of the piston rod 130 may be pivotally connected to the proximal end 100 of the arm 90, 92 as indicated at 132.

Figure 7:
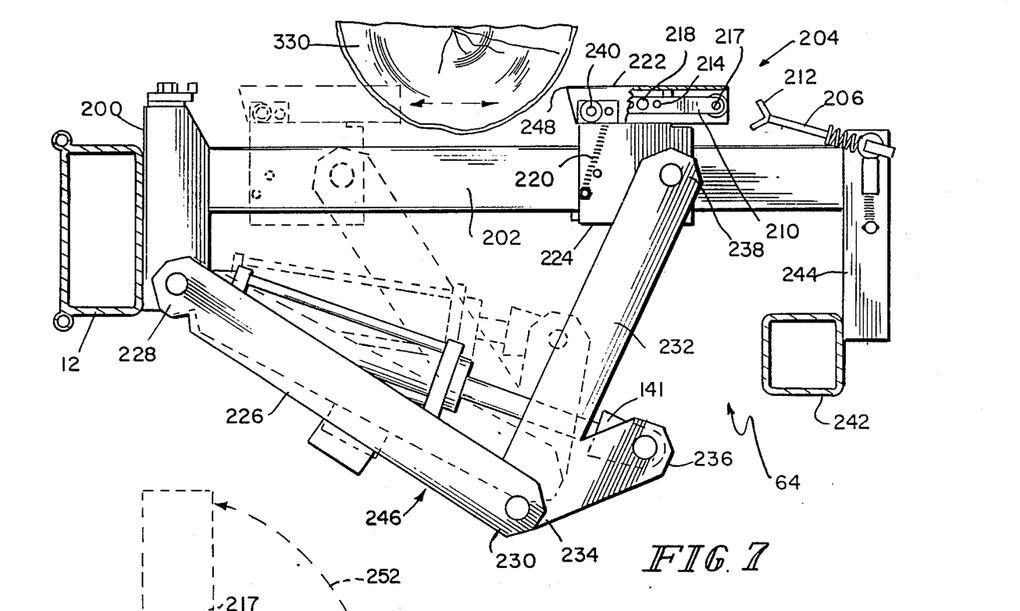
FIG. 7 is a fragmentary sectional view showing how the log-clamping mechanism operates.
Figures 8, 9:
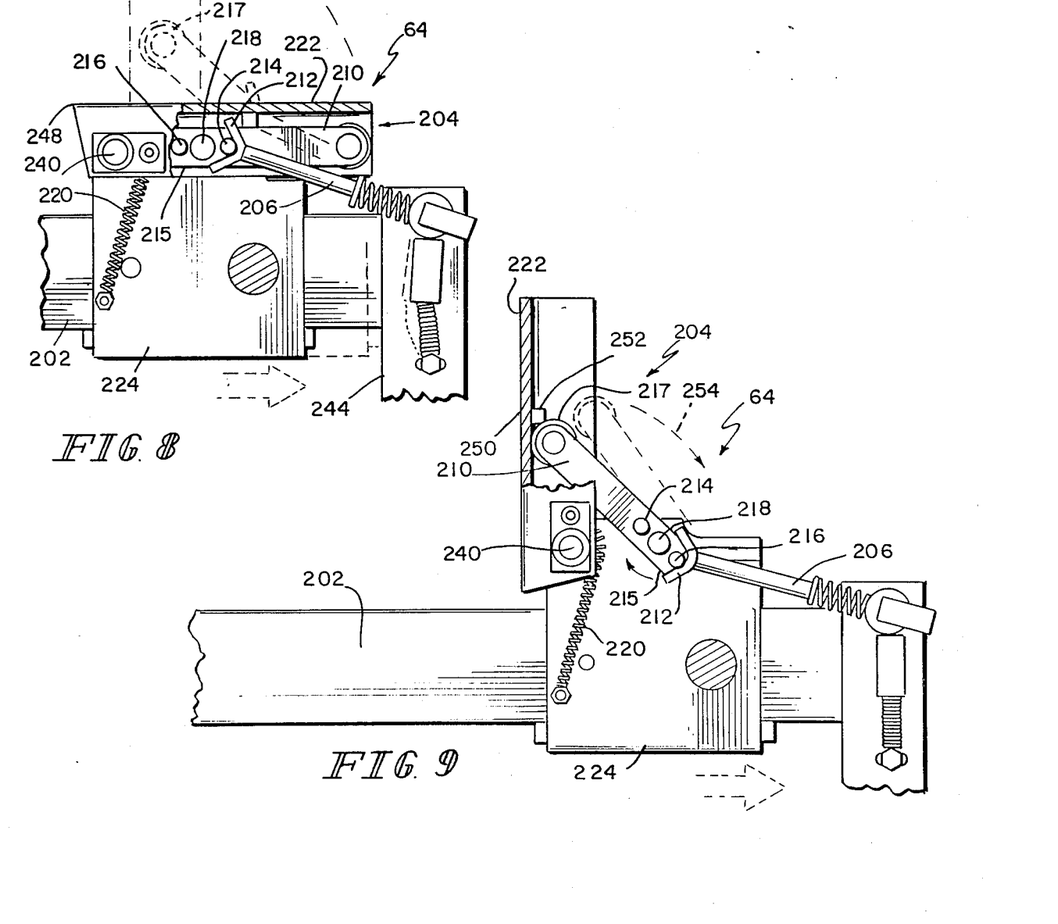
FIG. 8 is a similar fragmentary sectional view showing the log-clamping mechanism in its up position.
FIG. 9 is another fragmentary sectional view showing the log-clamping mechanism in its down position.

Referring to FIGS. 7, 8 and 9, clamping means 64 is described. Clamping means 64 includes a mounting bracket 200 affixed to a first side of platform 14 adjacent track 12. A slide track 202 has a first end affixed to mounting bracket 200 and extends laterally across platform 14 to a second side of platform 14 where a second end of slide track 202 is affixed to a mounting bracket 244. Mounting bracket 244 is attached to a side support member 242 of platform 14 (FIG. 2) and extends upwardly therefrom. Mounting bracket 200 also includes at an upper end a log stop 208.

A clamp member 204 is slidably received on slide track 202 for reciprocal movement between the two sides of platform 14. Clamp member 204 includes a slide member 224 which is slidably received on slide track 202 and a clamp bar 222 which is pivotally mounted to slide member 224 at pivot 240 for movement between a horizontal or reclining position as best shown in FIG. 8 to a vertical or upright position as best shown in FIG. 9.

Clamp member 204 also includes a prop leg 210 having a proximal end 215 pivotally mounted at 218 to slide member 224 for movement between a first horizontal position as best shown in FIG. 8 and an angled prop position for propping clamp bar 222 in its upright position as best shown in FIG. 9. Prop leg 210 includes a first pin 214 extending outwardly therefrom between pivot 218 and a distal end 217 and a second pin 216 extending outwardly therefrom between pivot 218 and a tip of proximal end 215 of prop leg 210.

A trip arm 206 is mounted on second mounting bracket 244 and extends upwardly and inwardly therefrom toward the first side of platform 14. Trip arm 206 includes a generally Y-shaped engaging means 212 at a distal end for engaging pins 214, 216 of prop leg 210 when clamp member 204 is moved to the second side of platform 14.

Clamp member 204 also includes a spring 220 having one end fastened to slide member 224 and a second end fastened to clamp bar 222. Spring 220 urges clamp bar 222 to its reclining or horizontal position as will be discussed in more detail later.

Clamp member 204 is reciprocated between the first and second sides of platform 14 on slide track 202 by a linkage 246 which in turn is driven by hydraulic cylinder 140. Linkage 246 includes a first linkage arm 226 pivotally mounted at a proximal end 228 to first mounting bracket 200. Linkage 246 also includes a second linkage arm 232 which is pivotally mounted at a distal end 238 to slide member 224. Second linkage arm 232 is also pivotally coupled to a distal end 230 of first linkage arm 226 at an elbow 234. A proximal end 236 of linkage arm 232 is pivotally coupled to the end of piston rod 141 of hydraulic cylinder 140. The end of hydraulic cylinder 140 opposite the end from which piston rod 141 extends is pivotally coupled to the first mounting bracket 200.

In operation, hydraulic cylinder 140 extends piston rod 141 which drives linkage 246. Linkage 246 moves clamp member 204 along slide track 202 toward the second side of platform 14 which would be to the right as shown in FIGS. 7-9. Conversely, when hydraulic cylinder 140 retracts piston rod 141, the linkage 246 moves clamp member 204 to the first side of platform 14 which is to the left in FIGS. 7-9. Assuming clamp bar 222 is in its reclining or horizontal position when clamp member 204 is moved along slide track 202 to the left toward the first side of platform 14, a proximal end 248 of clamp bar 222 will urge a log or cant against log stop 208. Alternatively, when clamp bar 222 is in its upright or vertical position, an inwardly facing surface 250 of clamp bar 222 will urge the log or cant against log stop 208 as clamp bar 204 is moved to the left along slide track 202 toward the first side of platform 14.

When clamp member 204 is moved all the way to the right along slide track 202 to the second side of platform 14, clamp bar 222 is moved between its horizontal or reclining position as best shown in FIG. 8 and its vertical or upright position as best shown in FIG. 9. Referring particularly to FIG. 8, the movement of clamp bar 222 from its horizontal position to its upright position is described. As clamp bar 204 is moved to the right along slide track 202 to the second side of platform 14, the Y-shaped engaging means 212 of prop arm 206 engages pin 214 of prop leg 210. This causes prop leg 210 to pivot counter-clockwise as shown by arrow 252 in FIG. 8 and distal end 217 of prop leg 210 pushes clamp bar 222 to its upright position. When clamp bar 222 reaches its full upright position as shown in FIG. 9, the distal end 217 of prop leg 210 slips beneath a stop 252 of clamp bar 222. Distal end 217 of prop leg 210 is held in place beneath stop 252 to support clamp bar 222 in its upright position by the action of spring 220 urging clamp bar 222 to its horizontal position.

Referring particularly to FIG. 9, the manner in which clamp bar 222 is moved from its upright position to its horizontal position is now described. Clamp bar 222 is in its upright position as clamp member 204 is moved to the far right of slide track 202 to the second side of platform 14. As can be seen in FIG. 9, prop leg 210 is in its angled support position. As clamp member 204 moves to the right, engaging means 212 of trip arm 206 engages pin 216 of prop leg 210. When engaging means 212 of trip arm 206 engages pin 216 of prop leg 210, it forces prop leg 210 to rotate clockwise as shown by arrow 254. It should be understood that even though spring 220 is urging stop 252 of clamp bar 222 against the distal end 217 of prop leg 210, sufficient force is applied to prop leg 210 by forcing pin 216 against trip arm 206 to overcome the force exerted by spring 220 holding distal end 217 of prop leg 210 in place beneath stop 252. As prop leg 210 rotates clockwise to its horizontal position, spring 220 urges clamp bar 222 to pivot clockwise toward its horizontal position.

Clamping means 64 thus provides a two position clamp. Illustratively, when clamp bar 222 is in its upright position, clamp member 204 is moved to the left along slide track 222 to urge a log toward log stop 208 and to clamp the log against log stop 208. Once the log has been squared into a cant as is conventional, clamp member 204 is moved to the right along slide track 202 to the second side of platform 14 to reposition clamp bar 222 from its upright position to its horizontal position. Clamp member 204 is then moved along slide track 202 to the left wherein the proximal end 223 of clamp bar 222 forces the log, which in this case will typically be a squared log or cant, against the log stop 208 and clamp it into place. Thus, one clamping mechanism can be utilized not only to move and clamp a rounded log but also move and clamp a squared log without causing undue waste. If only a one-position clamp were provided, a clamping mechanism tall enough to be used to clamp an uncut log would interfere with the cutting of all the squared log into boards. Alternatively, if a clamping mechanism was sized to clamp a squared log so that the maximum amount of boards could be cut from the cant, it would typically be too short to effectively manipulate and clamp an uncut log. Thus, the two-position clamp of this invention provides significant advantages over such one-position clamps. The clamping means of this invention can be used to effectively manipulate and clamp both uncut logs and squared logs without the need for two separate clamp mechanisms.

Figure 10:
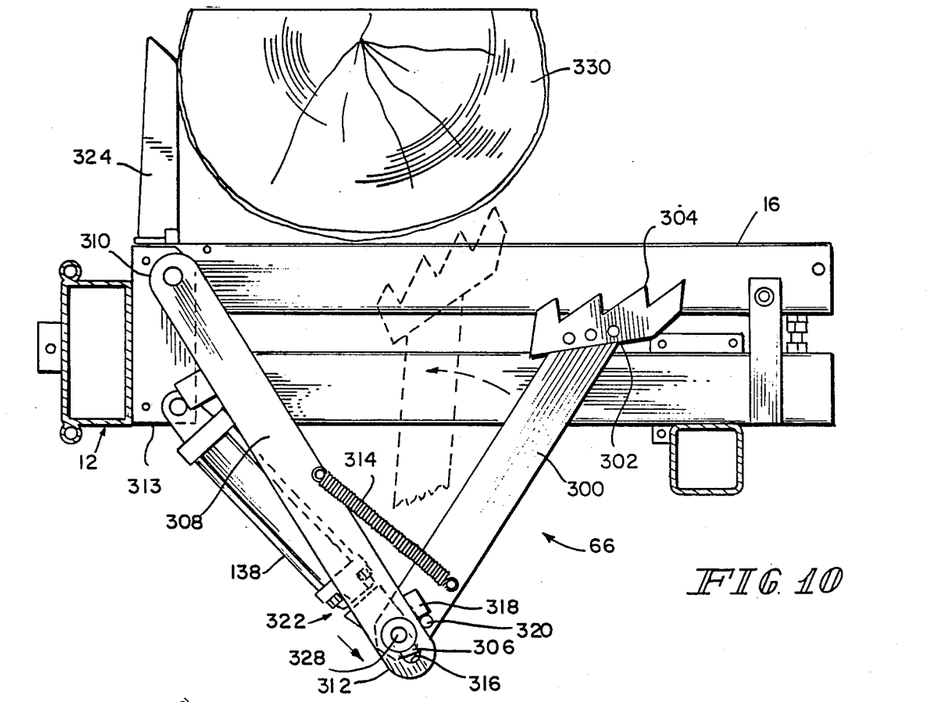
FIG. 10 is a fragmentary sectional view showing the log-rotating mechanism.
Figure 11:
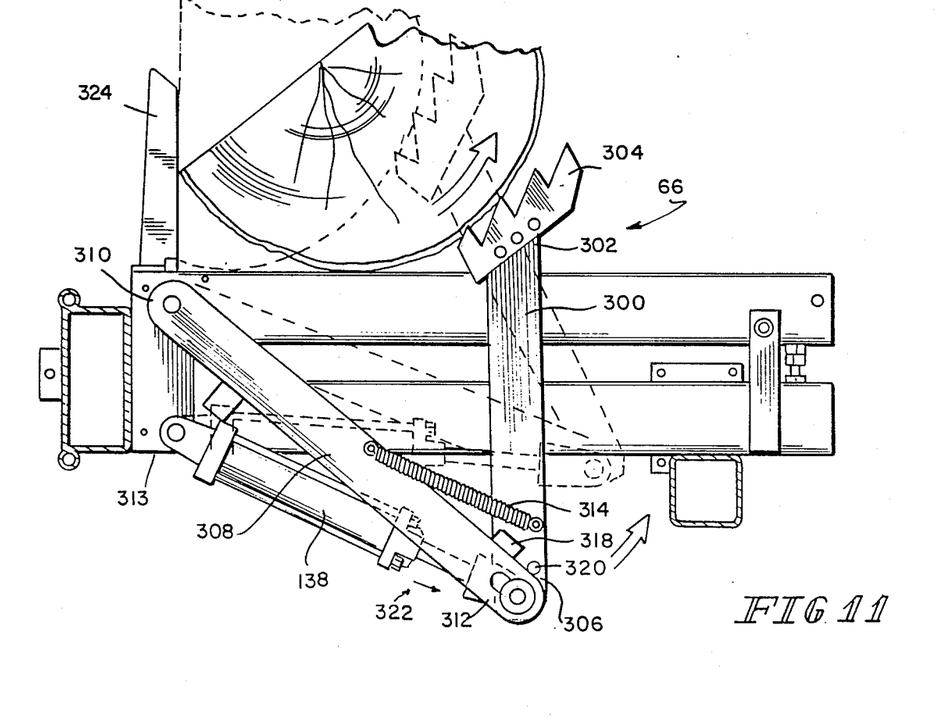
FIG. 11 is another fragmentary sectional view showing the log-rotating mechanism engaging and driving the log about its axis.

Referring particularly to FIGS. 10 and 11, log rotating means 66 is described. Log rotating means or log turner 66 includes a first linkage arm 300 having teeth or claws 304 attached at a distal end 302. A proximal end 306 of arm 300 is pivotally and slidably coupled to a distal end 312 of a second linkage arm 308. A proximal end 310 of second arm 308 is pivotally coupled to a mounting bracket 313 of platform 14 adjacent track 12. A spring 314 has one end affixed to first arm 300 and a second end affixed to second arm 308 and urges first arm 300 to pivot toward second arm 308 as will be described in more detail later.

As discussed, the proximal end 306 of first arm 300 is slidably and pivotally coupled to distal end 312 of second arm 308. The distal end 312 of second arm 308 has an elongated slot 316 extending therethrough. The proximal end 306 of first arm 300 has a first pivot pin 328 extending therefrom which is received in slot 316. Thus, the proximal end 306 of first arm 300 can move longitudinally within slot 316 in the distal end 312 of second arm 308 and also pivot about first pivot pin 328. In a preferred embodiment, there are two arms 300 which are sandwiched between two arms 308.

Mounted on a top surface of the distal end 312 of second arm 308 and extending upwardly therefrom is a stop block 318. A second pivot pin 320 extends outwardly from the proximal end 306 of the first arm 300 and coacts with stop block 318 as will be discussed in more detail later. The proximal end 306 of first arm 300 is pivotally coupled to an end of a piston rod 139 of hydraulic cylinder 138. An end of hydraulic cylinder 138 opposite the end from which piston rod 139 extends is pivotally coupled to mounting bracket 313.

Arms 300, 308 comprise a linkage 322 which is moved by hydraulic cylinder 138 to move the teeth 304 against a log 330 to turn it and also to retract teeth 304. In the embodiment shown, log 330 rests against side supports 324 which are also hydraulically actuated and interlocked with hydraulic cylinder 138 of log turner 66 to ensure that log turner 66 won't move unless side supports 324 are in their upright positions.

Referring particularly to FIG. 10, log turner 66 is shown in a down position wherein teeth 304 are beneath the tops of support members 16 of platform 14 on which log 330 rests. In this position, hydraulic cylinder 138 is retracted. This pulls proximal end 306 of first arm 300 toward the upper end of elongated slot 316 and forces pivot pin 328 of first arm 300 to the upper end of elongated slot 316. In doing so, second pivot pin 320 of first arm 300 is forced against stop block 318 of second arm 308. This forces first arm 300 to pivot clockwise to the down position and also stretches spring 314. In its down position, log turner 66 is beneath log 330 so it will not intereferre with any other manipulation of log 330, such as clamping and cutting, which needs to be done.

Hydraulic cylinder 138 extends to cause log turner 66 to turn log 330. As hydraulic cylinder 138 extends, the piston rod 139 of hydraulic cylinder 138 moves the proximal end 306 of first arm 300 downwardly until the first pivot pin 328 of first arm 300 reaches the lower end of elongated slot 316 in second arm 308. As first pivot pin 328 of first arm 306 moves downwardly, spring 314 urges first arm 300 to pivot counterclockwise about second pivot pin 320 until first pivot pin 328 reaches the lower end of elongated slot 316. When this occurs, first arm 300 is generally in a vertical position as indicated by the phantom lines in FIG. 10. Once first pivot pin 328 reaches the lower edge of elongated slot 316, further extension of hydraulic cylinder 138 causes the linkage 322 to move the distal end 302 of arm 300 upward to turn log 330 as shown in FIG. 11. As the teeth 304 on the distal end 302 of arm 300 contact log 330, spring 314 permits arm 300 to pivot to adjust itself to the log and urges arm 300 toward arm 308 to urge teeth 304 against log 330.

As discussed, side supports 324 are also hydraulically actuated to move from a horizontal non-use position to a vertical position to provide a stop against which log 330 is turned and are hydraulically interlocked with log turner 66. Hydraulic cylinder 136 (FIG. 12) which actuates side supports 324 is hydraulically interlocked with hydraulic cylinder 138, which actuates log turner 66, by sequence valves 326, 327 to insure that side supports 324 are in their upright position before hydraulic cylinder 138 can be extended. Further, these sequence valves system require that hydraulic cylinder 138 be fully retracted before hydraulic cylinder 136 can retract to lower side supports 324.

Figure 12:
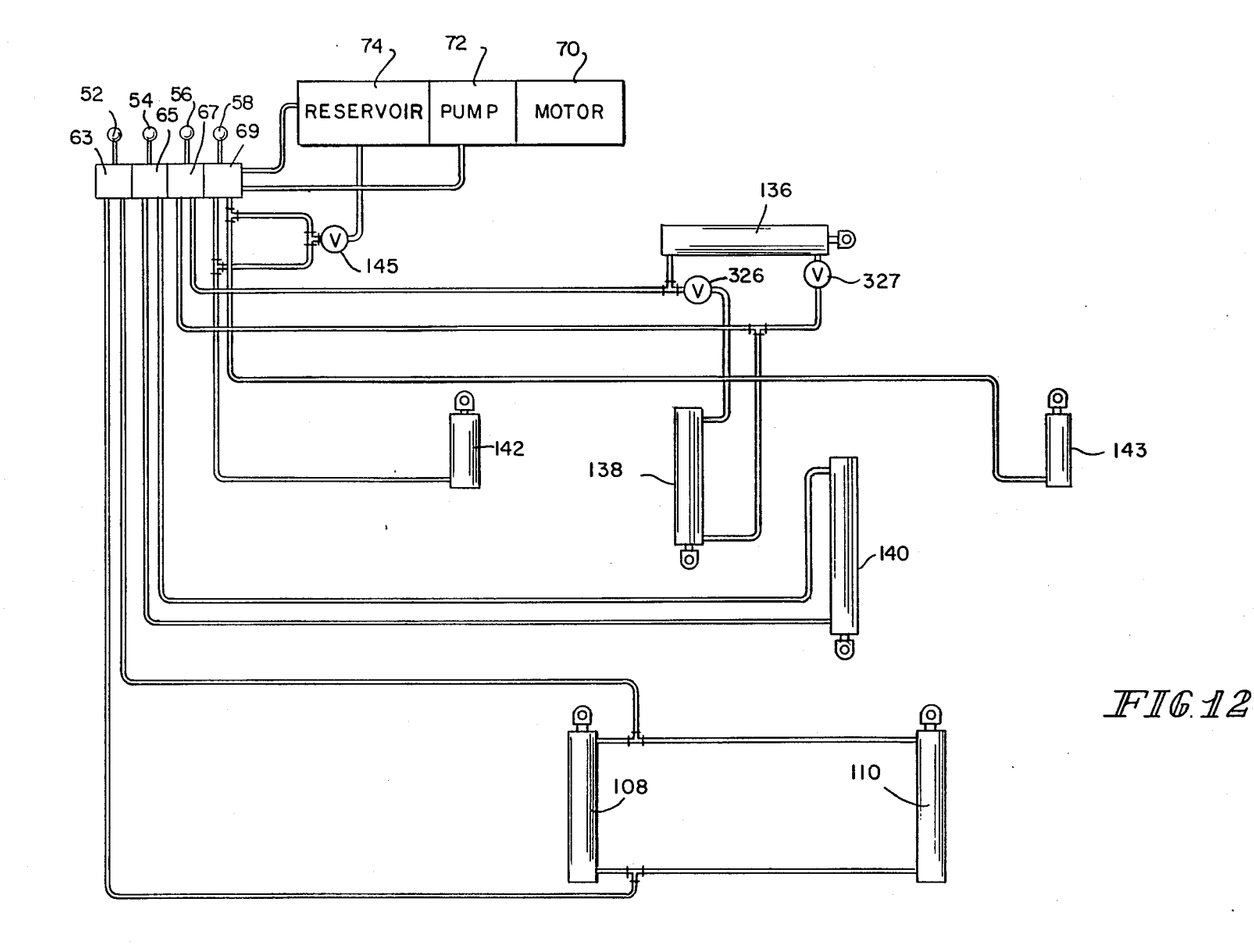
FIG. 12 is a diagrammatic view of the hydraulic system of the present invention.

FIG. 12 is a schematic of a hydraulic system for the invention described herein. As has been discussed previously, arms 90, 92 of log loading means 62 are moved by hydraulic cylinders 108, 110. This is accomplished by manipulating lever 52 to an appropriate position. By doing so, pump valve 63, which is coupled to hydraulic pump 72 and reservoir 74 in a conventional fashion, couples the hydraulic pump 72 to one side of cylinders 108, 110 while coupling the other side of cylinders 108, 110 to the reservoir as is appropriate. In the same fashion, valve 65 is coupled to hydraulic pump 72 and reservoir 74 and, when actuated by the manipulation of lever 54, causes hydraulic cylinder 140 to extend and retract to move clamp member 204 of clamping means 64 laterally across platform 14 on slide track 202 as has been discussed. Along the same lines, pump valve 67 in coupled to hydraulic pump 72 and reservoir 74 and, when actuated by the manipulation of lever 56, causes hydraulic cylinders 136, 138 to extend and retract to raise and lower side supports 324 and extend and retract log turner 66. Similarly, pump valve 69 is coupled to hydraulic pump 72 and reservoir 74 and, when actuated by the manipulation of lever 58, causes hydraulic cylinders 142, 143 to extend and raise toe boards 400, 402 (FIGS. 1 and 2) which comprises log levelling means 68. Illustratively, hydraulic cylinders 142, 143 are single acting, spring return cylinders so that toe boards 400, 402 are lowered by the actuation of a pressure-relief valve 145.

Referring to FIG. 2, log levelling means 68 includes toe boards 400, 402 provided adjacent the outer edges of the two outermost support members 16 of platform 14. A toe board, as is known, is a member which is moved vertically to raise and lower an end of the log. In cutting a log, it is important that the heart of the log be parallel with the plane of the platform on which the log rests to optimize the amount of lumber which can be cut from the log. Since logs are tapered, toe boards are often provided to level the log. In the embodiment shown in FIG. 2., toe boards 400, 402 are provided for vertical adjustment of either end of the log which rests upon platform 14. Referring to FIG. 12, toe board 400 is vertically moved by hydraulic cylinder 142 and toe board 402 is vertically moved by hydraulic cylinder 143. Illustratively, moving lever 58 in one direction causes pump valve 69 to actuate hydraulic cylinder 142 to raise toe board 400 while moving lever 58 in a second direction causes pump valve 69 to actuate hydraulic cylinder 143 to raise toe board 402. Manually actuated pressure-relief valve 145 is provided to vent hydraulic cylinders 142, 143 to reservoir 74 to lower toe boards 400, 402.

Although the invention has been described in detail with reference to a certain preferred embodiment, variations and modifications exist within the scope and spirit of the invention as described and defined in the following claims.

What is claimed is:

1. A sawmill comprising elongated track means, platform means for supporting a log adjacent the track means, a carriage movable longitudinally along the track means past the platform, cutting means mounted on the carriage to cut the log on the platform, means for loading the log onto the platform, said loading means including log engaging means movable toward and away from the platform, said log engaging means extending outwardly from a first side of said platform, ground engaging means for engaging the ground including a ground engaging element, said ground engaging means extending outwardly from said first side of said platform, means for driving said log engaging means toward and away from said platform, said driving means acting between said log engaging means and said ground engaging element outwardly of said first side of the platform.

2. The sawmill of claim 1 wherein the driving means includes a cylinder having a first end coupled to the log engaging means and a second end coupled to the ground engaging element.

3. The sawmill of claim 1 wherein the log engaging means includes an arm having a proximal end pivotally coupled to the platform and a distal end for supporting the log.

4. The sawmill of claim 3 wherein the driving means includes a hydraulic cylinder having a first end pivotally coupled to the arm adjacent the proximal end of the arm and a second end pivotally coupled to the ground engaging element, the cylinder extending to rotate the arm up toward the platform to carry the log toward the platform and retracting to rotate the arm down toward the ground.

5. The sawmill of claim 4 wherein the driving means includes a hydraulic pump, an electric motor coupled to the pump for powering the pump, means for coupling the hydraulic pump to the cylinder, and means for coupling the electric motor to a source of electricity only when the carriage is near a proximal end of the track means.

6. The sawmill of claim 4 wherein the log engaging means includes a plurality of said arms having proximal ends pivotally coupled to the platform and distal ends for supporting the log.

7. The sawmill of claim 6 wherein the arms are generally S-shaped and includes a cross-member rigidly coupling the arms to each other, the ground engaging means including a ground engaging leg for each arm which underlies at least a portion of the arm, each ground engaging leg including a knee from which extend first and second members at an angle to each other, the first member pivotally coupled to the platform means at a distal end, at least a portion of the second member resting upon the ground, the portion of the arm overlying a ground engaging leg resting upon the second member of that ground engaging leg when the arm is in a first position for receiving the log, the driving means including at least one of said hydraulic cylinders for each arm and underlying ground engaging leg, each hydraulic cylinder having a first end coupled to the proximal end of one of the arms adjacent a point at which that arm is pivotally coupled to the platform means and a second end coupled to the ground engaging leg underlying that arm adjacent the knee of that ground engaging leg, each hydraulic cylinder extending to act between the arm and underlying ground engaging leg to which it is coupled to move that arm to a second position above the platform to move the log onto the platform and retracting to act between that arm and underlying ground engaging leg to move that arm from its second position to its first position.

8. The sawmill of claim 1 and further including a wheel and axle assembly on which is mounted the platform and track means, the log engaging means and ground engaging means pivotal between a use position wherein the log engaging means receives a log and is driven toward the platform to drop a log on the platform and a storage position generally above and over the platform.

9. A sawmill comprising elongated track means, platform means for supporting a log adjacent the track means, a carriage movable longitudinally along the track means past the platform, cutting means mounted on the carriage to cut the log on the platform, means located adjacent a first side of the platform means for loading the log onto the platform, said loading means including log engaging means movable toward and away from the platform, and means pushing against the ground outwardly from said first side of the platform means connected to drive the log engaging means toward and away from the platform.

10. The sawmill of claim 9 and further including ground engaging legs, each ground engaging leg having a knee from which extend first and second segments at an angle to each other, the first segment pivotally coupled to the platform at a proximal end, at least a portion of the second segment laying on the ground, the log engaging means including a plurality of S-shaped arms fixably coupled to each other, each arm having a proximal end for pivotally coupled to the platform means and a distal end for receiving the log, the arms pivotable by the driving means between a first position for receiving a log wherein they rest on the second segments of respective ground engaging legs to a second position above the platform to move the log onto the platform, the driving means including means coupled to at least one ground engaging leg adjacent the knee of the ground engaging leg and to the arm which rests on the second segment of the ground engaging leg when in the arm is in its first position for acting between the arm and ground engaging leg to move the arms between their first and second positions.

11. A sawmill comprising elongated track means, platform means for supporting a log adjacent the track means, a carriage movable longitudinally along the track means past the platform, cutting means mounted on the carriage to cut the log on the platform, an arm having a proximal end pivotally coupled to the platform and a distal end extending outwardly of the platform means at one side thereof for supporting the log, means for driving the arm to rotate the arms' distal end between the ground and the platform to load the log onto the platform, the drive means including means for pushing against the ground outwardly of said one side of the platform means connected to rotate the arm between the ground and the platform.

12. The sawmill of claim 11 wherein the means for pushing against the ground to rotate the arm includes a cylinder having a first end coupled to the arm and a second end for pushing against the ground, the drive means further including means for extending the cylinder to rotate the arm from the ground to the platform and for retracting the cylinder to rotate the arm from the platform to the ground.

13. The sawmill of claim 12 and further including a plurality of said arms having proximal ends pivotally coupled to the platform and distal ends for supporting the log.

14. The sawmill of claim 13 wherein the drive means includes at least one of said cylinders for each arm.

15. A sawmill comprising elongated track means having a proximal end and a distal end, platform means for supporting a log adjacent the track means, a carriage movable longitudinally along the track means past the platform, cutting means mounted on the carriage to cut the log on the platform, means for loading the log onto the platform, said loading means including log engaging means movable toward and away from the platform, means for driving said log engaging means toward and away from said platform, means for actuating said drive means to cause the drive means to drive said log engaging means, means for interlocking said drive means to said actuating means to allow the actuating means to actuate the drive means only when said carriage is in a predetermined position.

16. The sawmill of claim 15 wherein the actuating means is located near the proximal end of the track means and the means for interlocking the drive means to the actuating means includes means for interlocking the drive means to the actuating means only when the carriage is near the proximal end of the track means.

17. The sawmill of claim 16 wherein the actuating means includes means responsive to an electrical signal for causing the actuating means to actuate the drive means, and the interlock means includes means for coupling the actuating means to a source of the electrical signal only when the carriage is near the proximal end of the track means.

18. The sawmill of claim 17 wherein the interlock means includes a set of electrical contacts for coupling the actuating means to the source of the electrical signal and means for closing the electrical contacts to couple the actuating means to the source of the electrical signal only when the carriage is near the proximal end of the track means.

19. The sawmill of claim 17 wherein the electrical signal source is carried by the carriage and the interlock means includes at least one electrical contact mounted on the carriage and connected to the source of the electrical signal and at least one electrical contact coupled to the actuating means and mounted near the proximal end of the track means, the carriage bringing the contact mounted on the carriage into electrical engagement with the contact mounted near the proximal end of the track means to couple the actuating means to the source of the electrical signal only when the carriage is near the proximal end of the track means.

20. The sawmill of claim 15 wherein the driving means includes a fluid motor, the actuating means including means for providing a source of driving fluid for the fluid motor, and the interlock means includes means for allowing the actuating means to provide the source of driving fluid only when the carriage is in the predetermined position.

21. The sawmill of claim 16 wherein the fluid motor includes a hydraulic cylinder, the actuating means includes a hydraulic pump and a reservoir of fluid, and the interlock means includes means for actuating the hydraulic pump for pumping fluid from the reservoir to provide the source of driving fluid.

22. The sawmill of claim 21 wherein the actuating means includes an electric motor for actuating the hydraulic pump and the interlock means includes means for coupling the electric motor to a source of electricity only when the carriage is in the predetermined position.

23. The sawmill of claim 22 wherein the actuating means further includes operator actuated valve means for coupling the cylinder to the hydraulic pump.

24. The sawmill of claim 22 wherein the interlock means includes a set of electrical contacts for coupling the electric motor to the source of electricity and means for closing the electrical contacts to couple the electric motor to the source of electricity only when the carriage is in the predetermined position.

25. The sawmill of claim 22 wherein the source of electricity is carried by the carriage and the interlock means includes at least one electrical contact carried by the carriage and coupled to the source of electricity and at least one electrical contact coupled to the electric motor and mounted on the track means at the predetermined position, the contacts being brought into electrical engagement to couple the electric motor to the source of electricity only when the carriage is in the predetermined position.

26. The sawmill of claim 25 wherein the predetermined position is near the proximal end of the track means.

27. A sawmill comprising elongated track means having a proximal end and a distal end, platform means for supporting a log adjacent the track means, a carriage movable longitudinally along the track means past the platform, cutting means mounted on the carriage to cut the log on the platform, at least one means for handling the log, means for driving said log handling means, means for actuating said log handling means, means for interlocking said drive means to said actuating means to allow the actuating means to actuate the drive means only when said carriage is in a predetermined position.

28. The sawmill of claim 27 wherein the actuating means includes means responsive to an electrical signal for causing the actuating means to actuate the drive means and the interlock means includes means for coupling the actuating means to a source of the electrical signal only when the carriage is in the predetermined position.

29. The sawmill of claim 28 wherein the source of the electrical signal comprises a source of electrical power for powering the actuating means.

30. The sawmill of claim 28 wherein the interlock means includes a set of electrical contacts for coupling the actuating means to the source of the electrical signal and means for closing the electrical contacts to couple the actuating means to the source of the electrical signal only when the carriage is in the predetermined position.

31. The sawmill of claim 30 wherein the log handling means includes at least one of means for rotating the log, means for clamping the log, means for loading the log onto the platform, and means for levelling the log.

32. The sawmill of claim 29 wherein the source of electricity is carried by the carriage and the interlock means includes at least one electrical contact mounted on the carriage and coupled to the source of electricity, and at least one electrical contact mounted on the track means and coupled to the actuating means, the carriage bringing the electrical contact mounted on the carriage into electrical engagement with the contact mounted on the track means to couple the actuating means to the source of electricity only when the carriage is at the predetermined position.

33. The sawmill of claim 32 wherein the electrical contact mounted on the carriage comprises a first pair of electrical contacts and the electrical contact mounted on the track means comprises a second pair of electrical contacts.

34. The sawmill of claim 27 wherein the drive means includes a fluid motor, the actuating means includes means for providing a source of driving fluid for the fluid motor, and the interlock means includes means for allowing the actuating means to provide the source of driving fluid only when the carriage is in the predetermined position.

35. The sawmill of claim 34 wherein the actuating means includes operator actuated valve means for coupling the fluid motor to the source of driving fluid.

* * * * *